United States Patent
Yu

(10) Patent No.: US 7,678,477 B2
(45) Date of Patent: Mar. 16, 2010

(54) METHOD OF OPERATING A FUEL CELL STACK

(75) Inventor: Paul Taichiang Yu, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 502 days.

(21) Appl. No.: 11/612,136

(22) Filed: Dec. 18, 2006

(65) Prior Publication Data

US 2008/0145717 A1    Jun. 19, 2008

(51) Int. Cl.
*H01M 8/04* (2006.01)
(52) U.S. Cl. .......................................... 429/13; 429/34
(58) Field of Classification Search ................. None
See application file for complete search history.

(56) References Cited

U.S. PATENT DOCUMENTS

| | | | |
|---|---|---|---|
| 7,141,324 B2 * | 11/2006 | Margiott et al. | 429/17 |
| 2006/0046106 A1 * | 3/2006 | Yu et al. | 429/13 |
| 2008/0107936 A1 * | 5/2008 | Margiott et al. | 429/17 |

* cited by examiner

*Primary Examiner*—John S Maples

(57) ABSTRACT

A method of operating a fuel cell stack including disconnecting the primary electrical device and purging gas in the cathode reactant gas flow field by flowing air into the cathode reactant gas flow field. Thereafter, the gas in the cathode reactant flow field is purged again by flowing hydrogen into the cathode reactant gas flow field. Gas in the anode reactant gas flow field is purged by flowing air into the anode reactant gas flow field. Thereafter, the anode reactant gas flow field is filled with hydrogen and both the anode and the cathode are stored with hydrogen.

20 Claims, 3 Drawing Sheets

METHOD OF OPERATING A FUEL CELL STACK

TECHNICAL FIELD

The field to which the disclosure generally relates includes fuel cell stacks and methods of operating the same.

BACKGROUND

In vehicle applications, a fuel cell stack may be required to undergo more than 30,000 startup/shutdown cycles. During normal operation of the fuel cell stack, air is continuously flowing into the cathode side of the stack and hydrogen is continuously flowing into the anode side of the stack. During shutdown, if the electrical circuit is open and there is no longer a load on the cell, unacceptable anode and cathode potentials may develop resulting in catalyst and catalyst support oxidation and corrosion, and cell potential degradation.

SUMMARY OF EXEMPLARY EMBODIMENTS OF THE INVENTION

Various embodiments of the invention include fuel cell stacks and methods of operating the same.

Other exemplary embodiments of the present invention will become apparent from the detailed description provided hereinafter. It should be understood that the detailed description and specific examples, while indicating the exemplary embodiment of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

Figure 1:
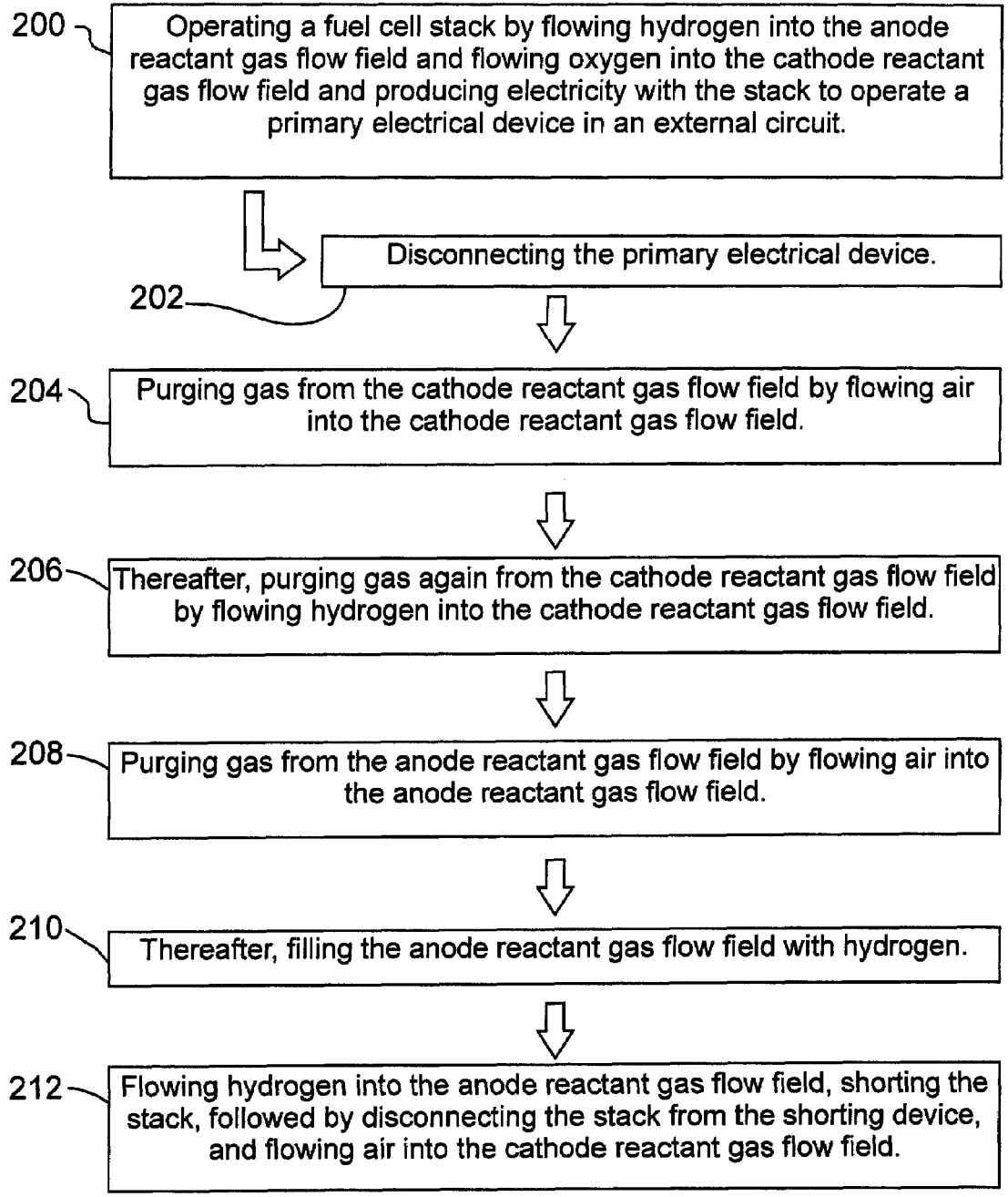
FIG. 1 is a flow chart illustrating a method according to one embodiment of the invention.

FIG. 1 is a flow chart illustrating one embodiment of the invention, including a number of steps. In a first step 200, a fuel cell stack may be operated by flowing hydrogen into the anode reactant gas flow field and flowing air into the cathode reactant gas flow field and producing electricity with the stack to operate a primary electrical device in an external circuit. In a second step 202, during shutdown of the fuel cell stack, the primary electrical device is disconnected from the fuel cell stack. In a third step 204, gas in the cathode reactant gas flow field is purged by flowing air into the cathode reactant gas flow field. In a fourth step 206, thereafter, the gas in the cathode reactant gas flow field is then purged again by flowing hydrogen into the cathode reactant gas flow field. In a fifth step 208, gas in the anode reactant gas flow field is purged by flowing air into the anode reactant gas flow field. In a sixth step 210, thereafter, the anode reactant gas flow field is filled with hydrogen. In a seventh step 212, startup of the fuel cell stack may be accomplished by flowing hydrogen into the anode reactant gas flow field with stack shorted followed by disconnecting the shorted stack and flowing air (to avoid fuel starvation during startup) into the cathode reactant gas flow field.

Figure 2:
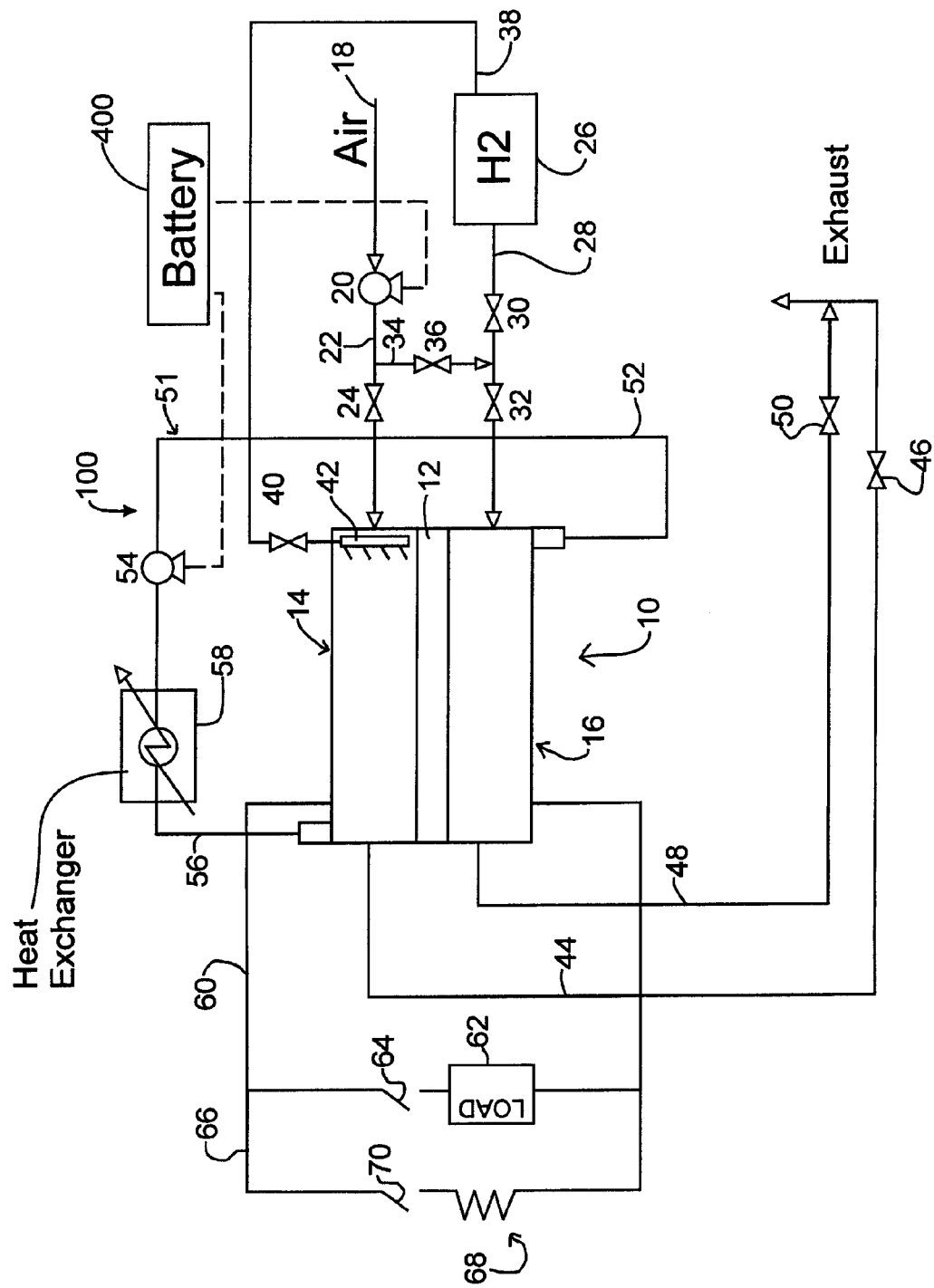
FIG. 2 is a schematic flow diagram of a fuel cell system and a method of operating the same according to one embodiment of the invention.

Referring now to FIG. 2, one embodiment of the invention includes a fuel cell system 100 which includes a fuel cell stack 10 including a plurality of fuel cells. Each fuel cell includes an electrolyte membrane 12 and a cathode side 14 having a cathode reactant gas flow field and an anode side 16 having an anode reactant gas flow field. An air inlet conduit 18 is provided and is connected to a compressor 20. A compressor outlet conduit 22 is connected from the compressor 20 to the cathode side 14 of the fuel cell stack. A first valve 24 is provided in the compressor outlet conduit 22 for controlling the flow of gas through the conduit 22.

A hydrogen source 26 is provided, such as a compressed hydrogen in a storage tank or liquid hydrogen in a storage tank. A first hydrogen tank outlet conduit 28 extends from the hydrogen source 26 to the anode side 16 of the fuel cell stack 10. Second and third valves 30, 32 are provided in the first hydrogen tank outlet conduit 28 to control the flow of gas through portions thereof. A first bypass conduit 34 is provided and extends between the air compressor outlet conduit 22, at a location between the compressor 20 and the first valve 24, to the first hydrogen tank outlet conduit 28 at a position between the second valve 30 and the third valve 32. A second hydrogen gas outlet conduit 38 is connected to the hydrogen source 26 and to the cathode side 14 of the fuel cell stack 10. A fifth valve 40 is provided in the second hydrogen tank outlet conduit 38 to control the flow of gas therethrough. A hydrogen distributor device 42 is provided in the cathode side 14 of the fuel cell stack 10. A cathode exhaust conduit 44 is connected to the cathode side 14 of the fuel cell stack and includes a sixth valve 46 therein for controlling the flow of gas through the cathode exhaust conduit 44. An anode exhaust conduit 48 is connected to the anode side 16 of the fuel cell stack 10 and a seventh valve 50 is provided in the anode exhaust conduit 48 to control the flow of gas therethrough.

The fuel cell stack 10 may be cooled using a cooling system 51 including a coolant fluid outlet conduit 52 connected to the fuel cell stack 10, for example on the anode side 16 on one end and to a coolant pump 54 on a second end. A coolant fluid inlet conduit 56 is connected on one end to the coolant pump 54 and to the cathode side 14 of the fuel cell stack 10 on the other end. A heat exchanger 58 may be provided in the coolant loop, for example, between the pump 54 and the cathode side 14 of the fuel cell stack 10.

Electricity produced by the fuel cell stack 10 is used in a first electrical path 60 which includes a primary load 62, such as an electric motor, or an electric machine and includes a first electrical switch 64 for connecting and disconnecting the primary load 62 from the fuel cell stack 10. A second electrical path 66 is provided and connected to the fuel cell stack 10 and includes a relatively low-load device 68, such as a resistor, and includes a second electrical switch 70 for connecting and disconnecting the low-load device 68 from the fuel cell stack 10. The low-load device 68 is used to short the fuel cell stack as will be described hereafter. A battery 400 may be provided and connected to the air compressor 20 and to the coolant pump 54 to power each.

Referring again to FIG. 2, during normal operation of the fuel cell stack 10, valves 24, 32, 30, 50 and 46 are opened and valves 36 and 40 are closed. This arrangement allows hydrogen and air gases to flow into the anode and cathode sides 16 and 14 respectively during normal operation. To shut down the fuel cell stack 10, the seventh valve 50 in the anode exhaust conduit 48 is closed. Dry air is pumped through the cathode side 14 of the fuel cell stack 10 for a relatively short period of time to remove liquid water and steam. In one embodiment, the dry air is pumped through the cathode side 14 for less than 20 seconds. A relatively small amount of hydrogen is allowed to flow into the anode side 16 of the fuel cell stack to maintain positive pressure on the anode side 16.

Thereafter, the air compressor 20 is turned off and the first electrical switch 64 in the first electrical path 60 is opened to disconnect the primary load 62 from the fuel cell stack 10. The first valve 24 in the air compressor outlet conduit 22 is closed, and the fifth valve 40 in the second hydrogen tank outlet conduit 38 is opened to purge gas in the cathode reactant gas flow field by flowing hydrogen into the cathode reactant gas flow field. Flowing hydrogen into the cathode reactant gas flow field will draw the open circuit voltage down to zero and consume oxygen in the cathode side 16 by oxidation of hydrogen. At the same time, a battery 400 may be utilized to drive the coolant pump 54 to circulate coolant through the stack 10 to reduce the temperature of the stack 10. In one embodiment of the invention, the temperature of the stack is reduced to a temperature ranging from above 70° C. to above 50° C. When hydrogen reaches the sixth valve 46 in the cathode exhaust conduit 44, the sixth valve 46 is closed. The fifth valve 40 in the second hydrogen tank outlet conduit 38 is adjusted so that positive hydrogen pressure of approximately 1 to 2 kPa above ambient pressure is maintained on the cathode side 14 of the fuel cell stack 10.

Thereafter, the second valve 30 in the first hydrogen tank outlet conduit 28 is closed and the fourth valve 36 in the first bypass conduit 42 is opened. The seventh valve 50 in the anode exhaust conduit 48 is opened and the air compressor 20 is operated using auxiliary power from the battery 400 while the third valve 32 in the first hydrogen tank outlet conduit 28 remains opened and so that the anode side 16 of the fuel cell stack 10 is purged with air for a relatively short period of time. In one embodiment, the anode side is purged with air for less than 20 seconds. The air/hydrogen front resident time in the anode side 16 of the fuel cell stack 10 is not problematic because the cathode side 14 is filled with hydrogen. Consequently, the rate of air purge of the anode side 16 may have a wide range. When the anode side 16 has been purged completely with air, both the anode side 16 and the cathode side 14 of the fuel cell stack 10 are relatively dry and therefore freeze resistant.

Thereafter, the air compressor 20 is turned off and the fourth valve 36 in the first bypass conduit 34 is closed. The second valve 30 in the first hydrogen tank outlet conduit 28 is opened to allow hydrogen to fill the anode side 16 of the fuel cell stack 10. When hydrogen reaches the seventh valve 50 in the anode exhaust conduit 48, the seventh valve 50 is closed. At this point, both the anode side 16 and the cathode side 14 of the fuel cell stack are filled with dry hydrogen and the open circuit voltage between the anode and cathode is close to zero. Thereafter, the second electrical switch 70 in the second electrical path 66 is closed to short the stack to prevent the stack 10 from generating cell voltage greater than zero due to air, from ambient, diffusing into the anode side 16 and cathode side 14 of the fuel cell stack 10 unevenly. Air intrusion can occur even though both the seventh valve 50 in the anode exhaust conduit 48 and the sixth valve 46 in the cathode exhaust conduit 44 are closed tightly. In one embodiment of the invention, the pressure in the stack is balanced with ambient pressure so that hydrogen/air binary diffusion through tightly closed valves is relatively slow. After this fuel cell stack 10 has been shut down the stack temperature starts cooling down gradually. Because the open cell voltage is zero and the stack temperature is relatively low, this prevents the stack from being damaged.

In order to start up the fuel cell stack 10, the first valve 24 in the air compressor outlet conduit 22 is opened, the third valve 32 in the first hydrogen tank outlet conduit 28 is opened, the second valve 30 in the first hydrogen tank outlet conduit 28 is also opened, the seventh valve 50 in the anode exhaust conduit 48 is opened and the sixth valve 46 in the cathode exhaust conduit 44 is opened. The fifth valve 40 in the second hydrogen tank outlet conduit 38 is closed as well as the fourth valve 36 in the first bypass conduit 34. The second electrical switch 70 in the second electrical path 36 is closed to connect the resistor 68 from the fuel cell stack. The hydrogen is allowed to flow into the anode side 16 of the fuel cell stack 10 followed by opening the resistor 68 from the fuel cell stack and air compressor 20 is driven to flow air into the cathode side 14. Thereafter, the first electrical switch 64 in the first electrical path 60 is closed to connect the primary load 62 to the fuel cell stack 10.

Figure 3:
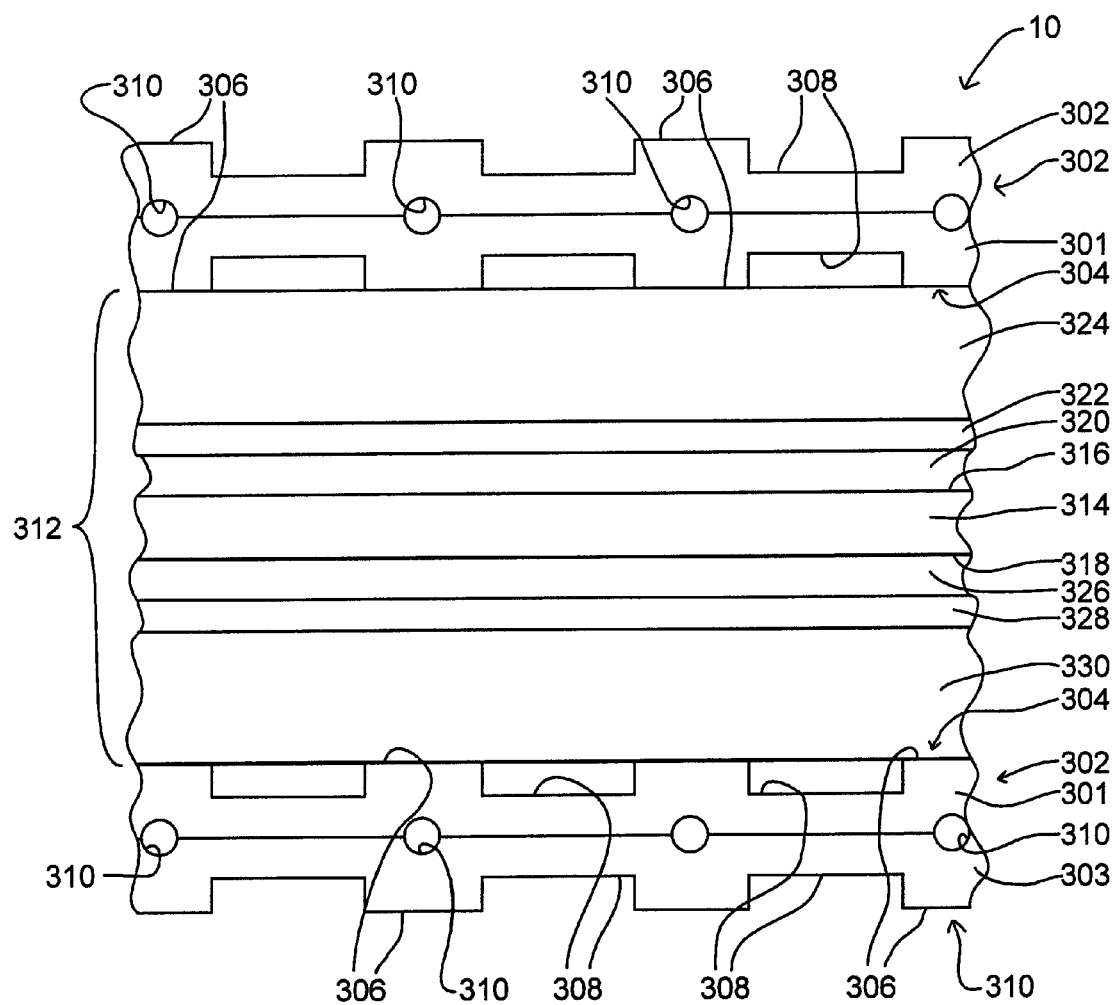
FIG. 3 illustrates a portion of a fuel cell stack according to one embodiment of the invention.

Referring now to FIG. 3, one embodiment of the invention may utilize a fuel cell stack 10 which includes a bipolar plate 302 and a soft goods portion 312. The bipolar plate 302 and the soft goods portion 312 are repeated to form a fuel cell stack with the bipolar plates being connected in series. The bipolar plate 302 may be a single piece or may include a first piece 301 and a second piece 302 that have been secured together, for example by welding. The bipolar plate 302 may take on a variety of configurations including a metal substrate that has been machined, stamped metal foils secured together, or an electrically conductive composite material. The bipolar plate 302 includes a first face 304 having a plurality of lands 306 and channels 308 defined therein. The bipolar plate 302 may include a second face 310 which similarly includes a plurality of lands 306 and a plurality of channels 308 formed therein. The channels 308 on one side 304 of the bipolar plate 302 may constitute the anode reactant gas flow field, and the channels 308 on the other side 310 of the bipolar plate 302 may constitute the cathode reactant gas flow field. Cooling channels 310 may be provided in the bipolar plate 302.

The soft goods portion 312 may include a solid electrolyte membrane 314 having a first face 316 and an opposite second face 318. A porous cathode 320 may be provided on the first face 316 of the electrolyte membrane 314. The cathode 320 includes a catalyst and a conductive support, such as carbon particles, and an ionomer. A microporous layer 322 may be provided over the cathode 320. The microporous layer 322 has relatively small pores and may include particles in a binder, such as carbon particles and polytetrafluoroethylene (PTFE). A porous gas diffusion media layer 324 may be provided over the microporous layer 322. The porous gas diffusion media layer 324 may be any porous electrically conductive material, such as carbon paper or felt. The bipolar plate 302 may be provided over the gas diffusion media layer 324. A porous anode 326 may be provided underlying the second face 318 of the solid electrolyte membrane 314. The anode 316 includes a catalyst on an electrically conductive support, such as carbon particles, and an ionomer. A second microporous layer 328 may be provided underlying the anode 326. A second gas diffusion media layer 330 may be provided underlying the second microporous layer 328. Another bipolar plate 302 is shown underlying the second gas diffusion media layer 330.

When the term "air" is used to describe a reactant gas or a purge gas, such shall be deemed to be equivalent to an oxygen rich gas, such as oxygen rich air or pure oxygen.

The above description of embodiments of the invention is merely exemplary in nature and, thus, variations thereof are not to be regarded as a departure from the spirit and scope of the invention.

What is claimed is:

1. A method comprising:
   operating a fuel cell stack comprising flowing hydrogen into an anode reactant gas flow field and flowing air comprising oxygen and nitrogen into a cathode reactant gas flow field of the fuel cell stack and producing electricity with the fuel cell stack to operate a primary electrical device in an external circuit connected to the fuel cell stack;
   shutting down the fuel cell stack comprising:
   disconnecting the primary electrical device from the fuel cell stack;
   purging gas in the cathode reactant gas flow field by flowing air comprising oxygen and nitrogen into the cathode reactant gas flow field;
   thereafter, purging gas from the cathode reactant gas flow field by flowing hydrogen into the cathode reactant gas flow field;
   purging gas from the anode reactant gas flow field by flowing air comprising oxygen and nitrogen into the anode reactant gas flow field;
   thereafter, filling the anode reactant gas flow field with hydrogen.

2. A method as set forth in claim 1 wherein purging gas from the cathode reactant gas flow field by flowing air into the cathode reactant gas flow field comprises flowing dry air into the cathode reactant gas flow field to remove water and steam therein.

3. A method as set forth in claim 2 further comprising maintaining a positive hydrogen pressure in the anode reactant gas flow field during the purging of the cathode reactant gas flow field by flowing hydrogen into the cathode reactant gas flow field.

4. A method as set forth in claim 1 further comprising circulating coolant through the fuel cell stack to reduce the temperature of the stack.

5. A method as set forth in claim 4 wherein circulating a coolant comprises operating a coolant pump using auxiliary power.

6. A method as set forth in claim 1 further comprising maintaining a positive hydrogen pressure on the cathode side of the fuel cell stack after purging the cathode reactant gas flow field by flowing hydrogen therein.

7. A method as set forth in claim 6 wherein the positive hydrogen pressure on the cathode side ranges from about 1-30 kPa.

8. A method as set forth in claim 1 wherein the purging of gas from the anode reactant gas flow field by flowing air comprising oxygen and nitrogen into the anode reactant gas flow field is conducted for less than 20 seconds.

9. A method as set forth in claim 1 wherein the purging of gas from the cathode reactant gas flow field and purging of gas from the anode reactant gas flow field makes the fuel cell stack sufficiently dry to withstand temperatures below freezing without damage to the fuel cell stack.

10. A method as set forth in claim 1 further comprising shorting the stack after filling the anode reactant gas flow field with hydrogen.

11. A method as set forth in claim 10 wherein the shorting the stack comprises connecting the fuel cell stack to an external circuit including a resistor.

12. A method as set forth in claim 1 wherein the purging gas from the cathode reactant gas flow field by flowing hydrogen into the cathode reactant gas flow field and filling the anode reactant gas flow field with hydrogen is conducted such that the stack is balanced with ambient pressure or the stack hydrogen pressure is higher than ambient pressure from about 1-30 kPa.

13. A method as set forth in claim 1 wherein the purging the gas from the cathode reactant gas flow field by flowing hydrogen into the cathode reactant gas flow field is conducted so that the oxygen in the cathode reactant gas flow field is either purged by hydrogen or consumed by reaction with the hydrogen.

14. A method comprising:
   operating a fuel cell stack having a cathode side and an anode side, the operating comprising flowing hydrogen into the anode side and flowing air comprising oxygen and nitrogen into the cathode side and producing electricity with the fuel cell stack and operating a primary electrical device in an external circuit with the electricity; shutting down the fuel cell stack comprising:
   purging the cathode side with dry air to remove liquid water and steam therefrom;
   purging the dry air from the cathode side by flowing hydrogen into the cathode side;
   purging the anode side by flowing air comprising oxygen and nitrogen into the anode side, and so that the purging of the anode side and the cathode side makes the anode side and cathode side substantially free of water;
   filling the anode side with hydrogen, therefore, both the cathode side and the anode side are filled with hydrogen.

15. A method as set forth in claim 14 further comprising shorting the stack.

16. A method as set forth in claim 14 further comprising disconnecting the stack from the primary electrical device prior to purging the cathode side with dry air.

17. A method as set forth in claim 16 further comprising causing hydrogen in the cathode side to consume oxygen.

18. A method as set forth in claim 16 further comprising using battery power to circulate a cooling fluid through the stack to reduce the temperature of the stack.

19. A method as set forth in claim 18 wherein the cooling fluid is circulated for a period of time after filling the anode side with hydrogen.

20. A method as set forth in claim 19 further comprising starting the fuel cell stack with the stack shorted by a resistor and flowing hydrogen into the anode side and thereafter unshorting the stack followed by flowing air comprising oxygen and nitrogen into the cathode side so that electricity is generated by the stack.

* * * * *